United States Patent [19]

van der Lely

[11] Patent Number: 4,582,141
[45] Date of Patent: Apr. 15, 1986

[54] MOTOR VEHICLE WITH DRIVING SPEED RESPONSIVE TO CHANGE IN ATTACHMENT LOAD

[76] Inventor: Cornelis van der Lely, 7 Brüschenrain, Zug, Switzerland

[21] Appl. No.: 120,930

[22] Filed: Feb. 10, 1980

[30] Foreign Application Priority Data

Feb. 12, 1979 [NL] Netherlands ............... 7901061
Feb. 19, 1979 [NL] Netherlands ............... 7901278
Feb. 19, 1979 [NL] Netherlands ............... 7901277

[51] Int. Cl.[4] .................. A01B 61/00; A01B 67/00
[52] U.S. Cl. ............................. 172/3; 60/451; 172/7; 180/14.6; 180/307; 192/0.032
[58] Field of Search ............... 172/2, 3, 7, 9, 10; 180/14.5, 197, 307, 14.6; 192/0.032, 0.033, 0.034, 3.58, 103 R; 56/DIG. 15; 37/DIG. 1; 60/389, 444, 451, 487

[56] References Cited

U.S. PATENT DOCUMENTS

| | | | |
|---|---|---|---|
| 2,639,569 | 5/1953 | Pasturczak | 56/DIG. 15 |
| 3,093,946 | 6/1963 | Pitt et al. | 60/451 X |
| 3,204,468 | 9/1965 | Ruoff | 74/15.4 |
| 3,221,821 | 12/1965 | van der Lely et al. | 172/7 |
| 3,236,322 | 2/1966 | Jonkers et al. | 172/3 X |
| 3,251,422 | 5/1966 | Allgaier et al. | 172/3 X |
| 3,550,688 | 12/1970 | Norcliffe | 172/9 |
| 3,927,528 | 12/1975 | van der Kolk et al. | 60/431 |
| 3,994,348 | 11/1976 | Schowalter | 172/9 |
| 4,028,890 | 6/1977 | Habiger et al. | 60/444 X |
| 4,036,340 | 7/1977 | Hufendiek | 192/0.033 X |
| 4,064,945 | 12/1977 | Haney | 172/9 X |
| 4,141,419 | 2/1979 | Buchele et al. | 172/7 X |
| 4,167,855 | 9/1979 | Knapp | 60/451 X |

FOREIGN PATENT DOCUMENTS

| | | |
|---|---|---|
| 622102 | 3/1963 | Belgium . |
| 669443 | 12/1965 | Belgium . |
| 762231 | 7/1967 | Canada ..................... 60/487 |
| 2340841 | 3/1975 | Fed. Rep. of Germany |
| 1362275 | 4/1964 | France . |
| 2166041 | 8/1973 | France . |
| 2254472 | 7/1975 | France . |
| 2261895 | 9/1975 | France . |
| 2308295 | 11/1976 | France . |
| 6404725 | 11/1965 | Netherlands . |
| 7316981 | 6/1975 | Netherlands . |
| 7611134 | 4/1978 | Netherlands . |
| 7700073 | 7/1978 | Netherlands . |
| 79/00036 | 2/1979 | World Int. Prop. O. . |
| 1182973 | 4/1970 | United Kingdom . |

Primary Examiner—Richard T. Stouffer
Attorney, Agent, or Firm—Penrose Lucas Albright

[57] ABSTRACT

A motor vehicle, preferably with a fuel injection engine, has a coupling, such as a multi-point hitch, connectable to an attachment. One or more of the hitch's arms are pivotable about a connection to the vehicle, and when the attachment is pushed, pulled or raised, the force resulting therefrom causes a rod associated with a variable speed torque converter to be displaced. The converter is a hydraulic pump-motor combination with swash plates pivotable to change the motor's output responsive to the rod's movement. The arrangement automatically slows or increases drive from the converter to the driven wheels when the attachment load changes. The control includes a valve in a hydraulic circuit actuated by the rod or other component. A sun-planet gear system is driven via the hydraulic motor to change the output to the vehicle's wheels while maintaining a constant engine speed. A brake on an annular drive member is operated manually to vary the converter's effect. In another embodiment, engine fuel injector plungers are reciprocated in stationary housings by cams to inject fuel into the engine cylinders. The housings have inlet and outlet bores that receive and return fuel depending on the plungers' positions in their housings. By changing the amount of fuel injected, a rack controlling the plungers by extreme movement in either direction short circuits the hydraulic system so converter's swash plates reduce or change the motor's output.

29 Claims, 6 Drawing Figures

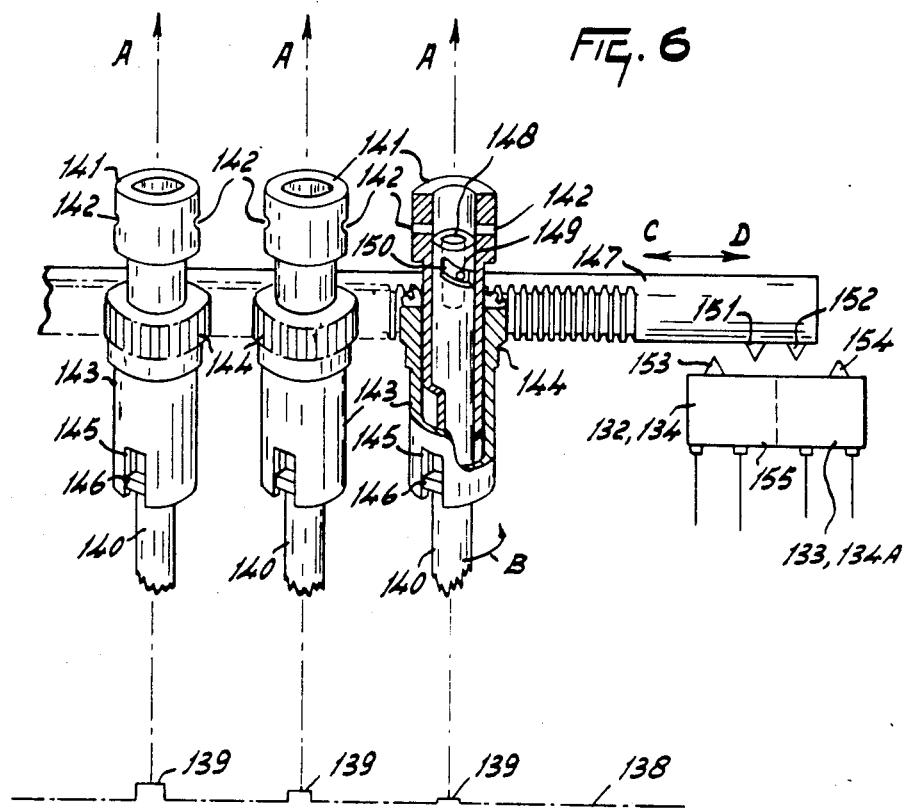

0
MOTOR VEHICLE WITH DRIVING SPEED RESPONSIVE TO CHANGE IN ATTACHMENT LOAD

SUMMARY OF THE INVENTION

Motor vehicles such as tractor towing an implement such as a plow suffer from the disadvantage that, when the plow is lifted near the end of a field, the speed of the tractor abruptly increases. The tractor driver will be giving full attention to the lifting of the implement and possibly the making of a turn, and so abrupt increases in speed can give rise to a considerable risk of accident.

According to a first aspect of the present invention there is provided a motor vehicle having coupling means to which equipment to be towed can be hitched, the vehicle having a control arrangement which is operative to reduce the travel speed of the vehicle upon a decrease in the load applied by the equipment.

According to a second aspect of the present invention there is provided a motor vehicle comprising a driving engine and a torque convertor, the torque convertor comprising a gear box and a steplessly variable positive displacement hydraulic drive arranged to transmit power between the engine and the gearbox.

According to a third aspect of the present invention there is provided a motor vehicle comprising a driving engine and a torque convertor, the torque convertor comprising a change-speed gear, an overriding mechanism and a gear wheel system arranged so that when the overriding mechanism is operative, the vehicle operates at its conventional working speed.

According to a fourth aspect of the present invention there is provided a motor vehicle comprising a driving engine and a torque convertor which comprises a gear wheel system, the speed of the output shaft of the gear wheel system being controllable by a change-speed gear acting upon the gear wheel system in a manner such that at the conventional working speed of the tractor the speed of the change-speed gear is zero or very small.

For a better understanding of the present invention and to show how it may be carried into effect, reference will now be made, by way of example, to the accompanying drawings, in which:

BRIEF DESCRIPTION OF THE DRAWINGS

FIG. 6 is a schematic illustration of fuel injectors, and control means therefore, of a tractor engine.

DESCRIPTION OF THE PREFERRED EMBODIMENTS

Figure 1:
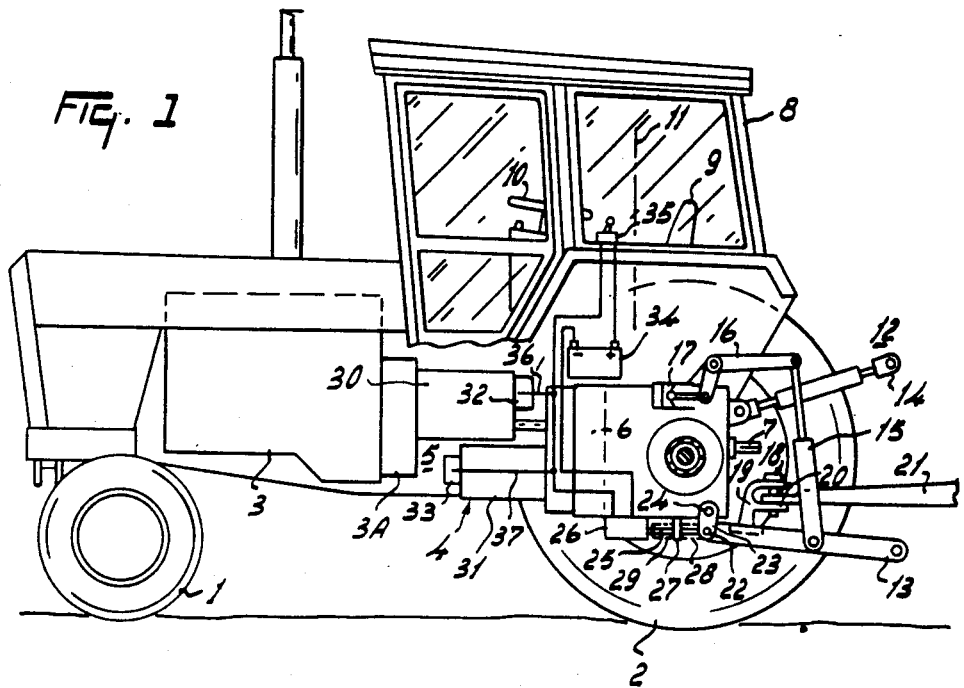
FIG. 1 is a side view of one embodiment of a tractor.
Figure 2:
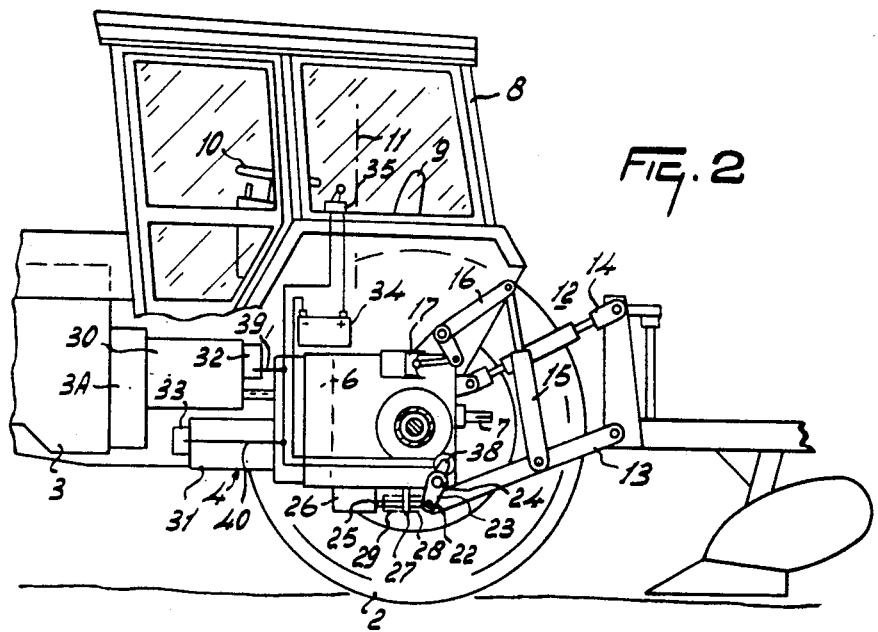
FIG. 2 is a side view of a second embodiment of a tractor.
Figure 3:
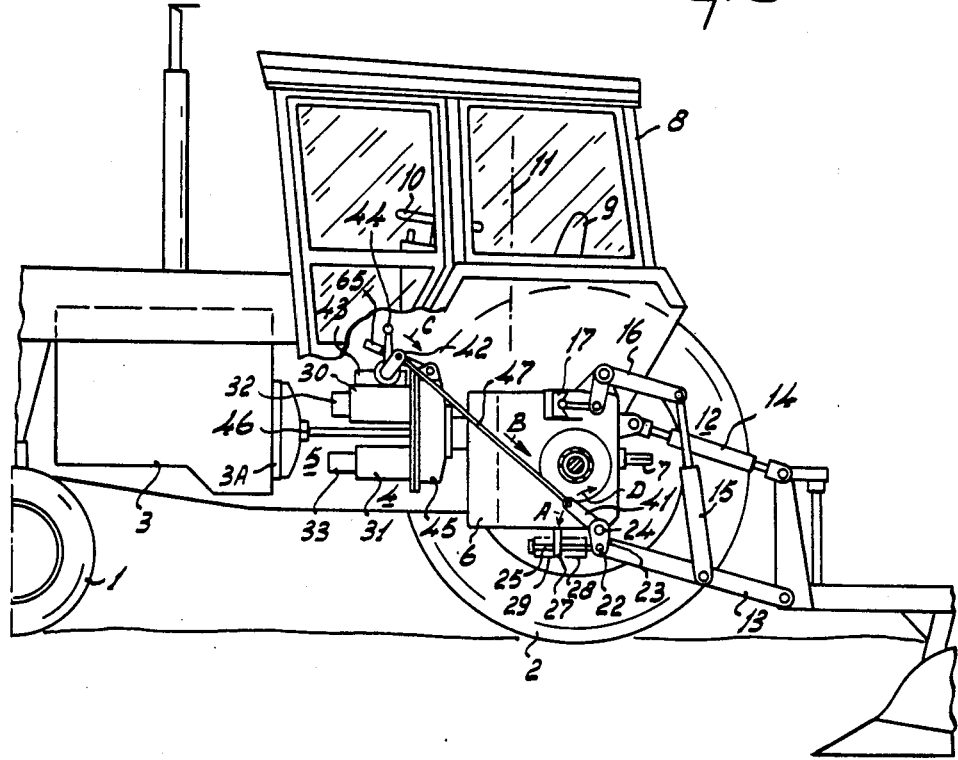
FIG. 3 is a side view of a third embodiment of a tractor.

The tractor shown in FIGS. 1 to 3 are agricultural tractors and each comprises a frame supported by front wheels 1 and rear wheels 2. The front wheels 1 are steerable and the rear wheels 2 are drivable by a driving engine 3, preferably a Diesel engine. The engine 3 is connected by a driver-operated clutch 3A and a torque converter 4 with the drivable rear wheels 2. The converter 4 comprises a steplessly variable hydraulic drive 5 and a gear box 6 having two or more gears which can be selected by the driver as well as a reverse gear which, when selected, provides rearwards travel with the usual operational speed. The hydraulic drive 5 is arranged between the engine 3 and the gear box 6. Power from the engine 3 is transmitted in succession through the clutch 3A, the hydraulic drive 5, the gear box 6 and a differential arranged between the two rear wheels 2, to the rear wheels. A power take-off shaft 7 arranged at the rear of the tractor frame is also drivable by the engine 3.

A driver's cab 8 is situated generally directly above the torque converter 4. This cab 8 accommodates a driver's seat 9 and a steering wheel 10. Near the steering wheel 10 there are further controls of the tractor. The driver's seat 9, the steering wheel 10 and at least some of the further controls are pivotable as a unit about a substantially vertical pivotal axis 11 lying in the vertical longitudinal plane of the tractor and between the driver's seat 9 and the steering wheel 10. This pivotable unit can be fixed by locking means in either of two positions offset from each other by 180° so that the driver can have a free view to the front of the tractor or to the rear of the tractor.

Near the rear of the tractor, the frame is provided with a three-point lifting device 12. Preferably a three-point lifting device is also provided at the front of the tractor. The lifting device 12 comprises two lower lifting arms 13 and one or two top arms 14. The arms 13 and 14 are provided at their ends away from the frame with coupling means for hitching an implement, a machine or a vehicle to the three-point lifting device 12. The lower lifting arms 13 are pivotally connected approximately midway along their length to lifting rods 15 which are inclined to the front from bottom to top. The top ends of the lifting rods 15 are pivotally connected to levers 16, which can be turned by hydraulic rams 17 under the control of the driver, these rams 17 being connected to the hydraulic system of the tractor.

The three-point lifting device 12 is also provided with a towing hitch 18. The hitch 18 comprises a towbar 19 extending transversely of the longitudinal plane of the tractor and provided, for example near that longitudinal plane, with lugs 20, to which can be coupled a drawbar 21 of an implement, a machine or a vehicle so as to be pivotable about a substantial vertical axis. The tow bar 19 is solely fastened to the two lower lifting arms 13 of the lifting device 12 and is shaped such that the coupling point of the drawbar 21, located between the lugs 20, is located above a plane going through the two lower lifting arms. Preferably the distance of the coupling point above that plane is equal to 10% to 40% of the vertical distance between the lower lifting arms 13 and the top lifting arm or arms 14.

A pivotal shaft 22 at the end of each of the two lower lifting arms 13 located nearer the tractor frame is journalled in a short arm 23, which is pivotally connected at its top end to a pivotal shaft 24 fastened to the tractor frame. Viewed in the no-load position illustrated in FIG. 1 the pivotal shaft 22 is located substantially vertically beneath the pivotal shaft 24. The shafts 22 and 24 extend substantially horizontally and transversely of the vertical longitudinal plane of the tractor. The distance between the shafts 22 and 24 is about 30% to 80% of the vertical distance between the center lines of the lifting arms 13 and the drawbar 21. The pivotal shaft 22 may be an uninterrupted shaft interconnecting the arms 23 located on the two sides of the tractor and the lower lifting arms 13.

Each pivotal shaft 22, or the single uninterrupted shaft 22, has fastened to it a rod 25 extending away from the pivotal shaft 22 to the front in a substantially horizontal direction. The front end of the rod 25 is displaceable in a bearing 26 rigidly secured to the tractor frame. Between the pivotal shaft 22 and the bearing 26 a support 27 is secured to the frame, this support 27 having a hole in which the rod 25 can slide. The support 27 is disposed midway between the pivotal shaft 22 and the end of the bearing housing 26 facing the shaft 22. Between the pivotal shaft 22 and the support 27 there is a helical spring 28. Another helical spring 29 is located between the support 27 and the bearing housing 26. The springs 28 and 29 co-axially surround the rod 25 and preferably have each a given bias tension. The end of each of the helical springs 28 and 29 away from the support 27 is secured to the rod 25, and the other end of each spring bears on the support 27. If desired, the springs 28 and 29 may be provided with damping means. FIG. 1 shows a medium position in which the two springs 28 and 29 are equally loaded. This medium position is assumed when the lifting device 12 and the drawbar 21 are unloaded. The end of the rod 25 located in the bearing 26 then occcupies a medium position and the pivotal shaft 22 is located substantially vertically beneath the pivotal shaft 24.

The hydraulic drive or change-speed gear 5 of the torque converter 4 comprises a hydraulic pump 30, drivable by the driving engine 3, and a hydraulic motor 31 communicating with one another through hydraulic ducts. An output shaft of the hyraulic motor 31 drives the rear wheels 2 through the gear box 6. The pump 30 is provided with a hydraulic control valve 32, by means of which an adjusting device in the form of a swashplate of the pump 30 can be adjusted from a position in which the swashplate is perpendicular to the center line of the pump (in which position the pump does not displace fluid) to positions in which the swashplate is inclined to the center line of the pump (the fluid displacement of the pump being dependent on the angle of inclination). In this embodiment the hydraulic motor 31 is also provided with an adjusting device in the form of a swashplate which can be set in a similar manner by means of a control valve 33.

The end of the rod 25 located in the bearing 26 forms part of an electrical displacement pick-up fed from the battery 34 of the tractor, which can be switched on and off by means of a switch 35 arranged near the driver. The pick-up may, for example, be an electro-magnetic device or it may comprise a variable resistor actuated by the rod 25, by means of which the current through the electric leads 36 and 37 to the change-speed gear is adjusted. The electric leads 36 and 37 are coupled, for example, with differential coils actuating the control valves 32 and 33 respectively as a function of the displacement of the rod 25 with respect to its bearing 26. The coupling is such that when the end of the rod 25 located in the bearing 26 is displaced out of the medium position in either direction, the control valve 32 and/or the valve 33 are adjusted so that the swashplate of the pump 30 and/or the swashplate of the motor 31 is or moved towards the position in which the swashplate is perpendicular to the center line of the pump or the motor respectively.

When the tractor is hauling a vehicle or another load along a substantially horizontal surface, the torque converter 4 will be set in a given position by the driver controlling the hydraulic drive 5 and the gear box 6 in a manner such that a desired travelling speed is achieved. With each selected transmission ratio of the gear box 6 a separate, stepless range of speeds is available from the hydraulic drive 5. If the load is applied by a drawn plow the speed of the plow can thus be adjusted so as to suit the nature of the ground to be worked and the characteristics of the driving engine. If the tractive force increases, for example when the plow encounters more solid soil or when, for example, a trailer hitched by the drawbar 21 is towed up a slope, the arm 23 will turn about the pivotal shaft 24 owing to the increase in tractive force in the drawbar 21 to an extent such that the pivotal shaft 22 pivots to the rear with respect to the direction of forward travel of the tractor. Thus the tod 25 is displaced from its medium position to the rear with respect to its bearing 26 against the effect of the springs 28 and 29. The displacement pick-up mounted in the bearing 26 then, via the leads 26 and 27 causes the control valve 32 and/or the control valve 33 to move the swashplate of the hydraulic pump 30 and/or that of the motor 31 towards the position in which it is perpendicular to the center line of the associated pump or motor so that the output speed of the motor 31 decreases as a result of which the travelling speed of the tractor automatically decreases.

When the tractor is towing a vehicle, for example a heavy mower-harvester, down a slope, the vehicle will push on the tractor through the drawbar 21 so that the arm 23 moves around the pivotal shaft 24 to move the pivotal shaft 22 forwardly with respect to the frame. As before this displacement is detected by the displacement pick-up in the bearing 26, and the control valve 32 and/or 33 is displaced to reduce the angle of inclination of the swashplate of the pump 30 and/or that of the motor 31. Thus, the output speed of the motor 31 decreases and the combination of tractor and vehicle slows down.

The control arrangement comprising the lifting device 12, the towbar 19, the arm 23, the rod 25, the displacement pick-up in the bearing 26 and the control valves 32 and 33 provides, therefore, an automatic adjustment to maintain constant a desired speed regardless of the instantaneous tractive force.

As shown in FIG. 1, the lifting rod 15 of the lifting device 12 is inclined to the front from bottom to top. When a plow is lifted from the earth by the lifting device 12 at the end of the furrow, a component of the force in each lifting rod 15 will move the pivotal shaft 22 forwardly with respect to the tractor frame. Again, the displacement pick-up in the bearing 26 will adjust the control valves 32 and/or 33 in a manner such that the output speed of the motor 31 decreases. This avoids the sudden increase in travelling speed which would otherwise occur as a result of the drop in tractive force when the plow is lifted. Such a sudden increase can cause accidents, for example at the end of a field where the driver's attention is concentrated on negotiating a curve. The lifting arms 13 may have a plurality of holes side by side for adjusting the inclined position of the lifting rod 15 according to the circumstances.

It should be noted that if the displacement pickup comprises a variable resistor, the resistor may comprise a resistance of which the central point is connected to the negative terminal of the battery 34, whereas the two ends of the resistance are connected with the positive terminal of the battery. The wiper is connected to the rod 25 and to the leads 36 and 37. In this way the same behavior of the control valves 32 and 33 is obtained when the wiper moves to either side of the central point. The values of the resistances on the two sides of the central point may be the same, but they may also differ from one another if different reactions of the torque converter are desired depending on whether the tractor is retarded or pushed forwards by the load.

FIG. 2 shows an embodiment in which the automatic control of the driving speed of the wheels brought about by the hydraulic drive 5 is interrupted when the lifting device 12 to which a plow is hitched is lifted out of a working position. Parts shown in FIG. 2 corresponding with those of FIG. 1 are designated by the same reference numerals. The arm 23 is extended upwardly by an arm 38, which in one position of the interconnected arms 23 and 28 actuates a switch mounted on the tractor frame. The contacts of the switch are connected by electric leads 39 and 40 to the control valves 32 and 33 of the pump 33 and the motor 31 respectively. When, after a heavy tractive force has been applied, for example when driving a plow through heavy soil, the plow is lifted at the end of the field in order to turn round and the tractive force consequently vanishes suddenly, the travelling speed of the tractor might suddenly increase in an undesirable manner due to an automatic control brought about by a torque convertor or due to a reaction brought about by a centrifugal governor of the Diesel engine 3, in which case the output speed of this engine would abruptly increase in its control range. In order to avoid this disagreeable situation for the driver, the construction shown in FIG. 2 ensures that such undesirable control is suppressed or a slow down is achieved when the lifting device is in a position above the working position of the plow. When the plow is lifted, its weight will producce a force in each lifting rod 15. When this lifting rod 15 is inclined forwardly from bottom to top when the lifting arm 13 is raised, a component of this force will urge the pivotal shaft 22 in the forward direction so that the arms 23 and 38 will turn against the force of the springs 28 and 29 into the position shown in FIG. 2, in which the arm 38 closes the switch so that the current circuit of the battery 34 is completed and the control valves 32 and/or 33 are energized through the electric leads 39 and 40 respectively so that the swashplate of the pump 30 moves towards or away from a position in perpendicular to the center line of the pump or the motor. This causes the tractor immediately to slow down or even stop, since the displaced fluid of the pump 30 drastically decreases or is reduced to zero.

The construction shown in FIG. 2 may be used with that of FIG. 1, in which, depending on the disposition of the switch in front of or behind the arm 38 the current circuit completed by the arm 38 causes the swashplate of the pump 30 and/or that of the motor 31 to turn to the position in which the output speed of the change-speed gear is zero, when a heavy tractive force or pushing force occurs abruptly.

In the embodiment shown in FIG. 3, parts corresponding with those of the preceding embodiments are again designated by the same reference numerals. The bearing 26 is omitted and the springs 28 and 29 act between the support 27 and stops on the rod 25.

Each lower lifting arm 13 is again connected with the spring-loaded rod 25 by the arm 23 as described above.

An arm 41 is rigidly connected with the arm 23 and is therefore also pivotable about the pivotal shaft 24. In a medium position the arm 41 extends away from the pivotal shaft 24 towards one end of an arm 42, which actuates a control valve 43. The control valve 43 sets the position of the swashplate of the hydraulic pump 30. The control valve 43 can also be actuated by a lever 44 operated by the driver, this lever 44 being fastened to the same pivotal shaft as the arm 42. The control valve 43 is fastened to the pump 30. The hydraulic motor 31 supplied by the pump 30 through hydraulic ducts is located vertically beneath the pump 30 in the embodiment shown in FIG. 3. Both the pump 30 and the motor 31 are fastened to a vertical cover plate 50 (FIG. 4) of a housing of planetary gear-wheel system 45 arranged between the hydraulic drive 5 and the gear box 6. The output shaft 46 of the engine 3 passes through the planetary gear-wheel system 45 and is linked by the gear box 6 and a pinion transmission to the power takeoff shaft 7. The center line of the output shaft 46 coincides with the center line of the housing of the gear-wheel system 45. The hydraulic drive 5 is disposed between the planetary gear-wheel system 45 and the engine 3.

Between the end of the arm 41 away from the pivotal shaft 24 and the free end of the arm 42 is arranged a coupling rod 47 which is pivotally connected both with the arm 41 and the arm 42. In the medium position shown in FIG. 3 the center lines of the arm 41 and the rod 47 are in line with one another. If desired the length of the arm 41 may be variable (for example by means of an adjusting screw) to allow for adjustment of the control arrangement.

Figure 4:
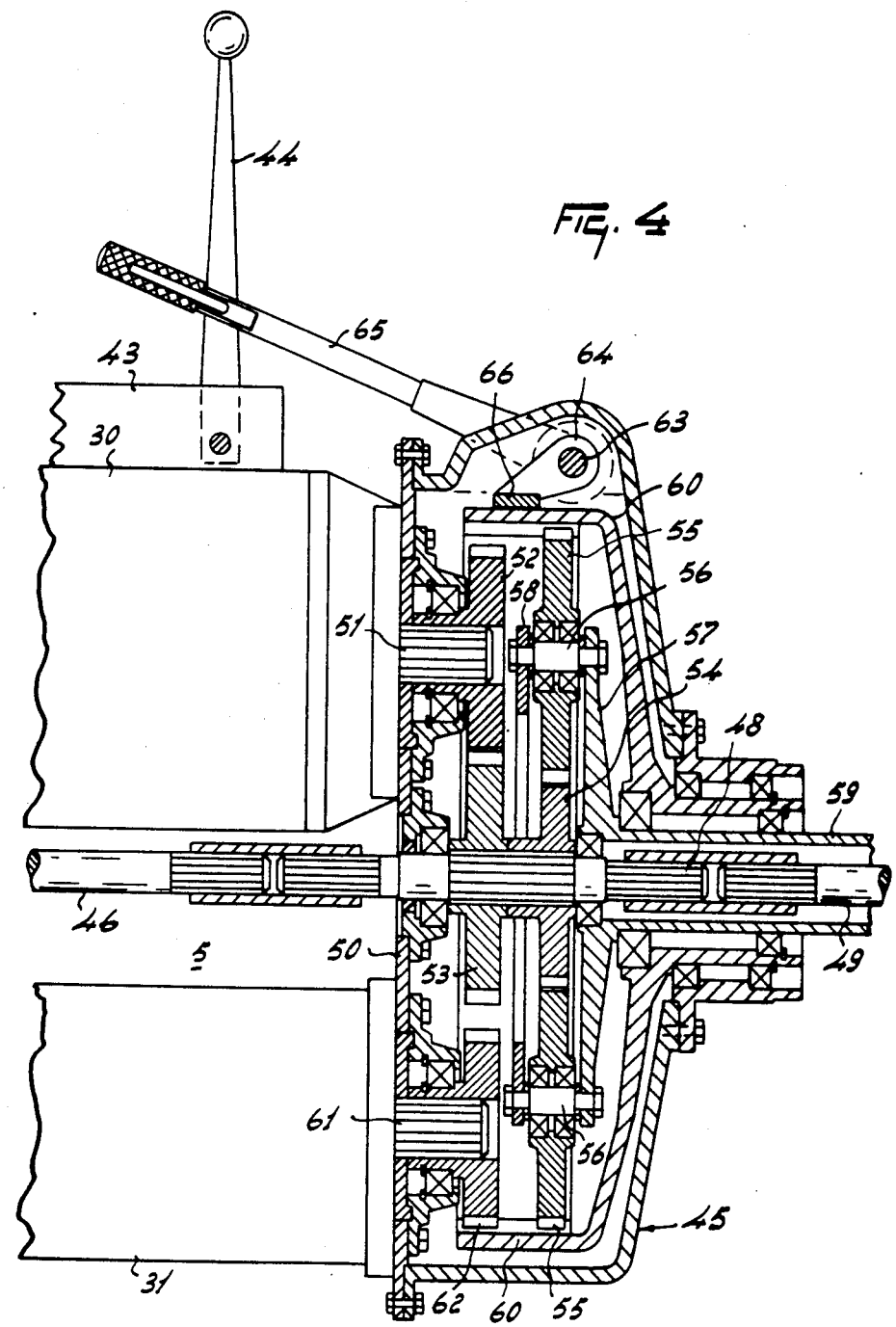
FIG. 4 is a partly sectional view of a change-speed mechanism of the tractor of FIG. 3.

The planetary gear-wheel system 45 in conjunction with the pump 30, the motor 31 and the output shaft 46 of the driving engine 3 is constructed as follows (FIG. 4). The output shaft 46 of the engine 3 is coupled with a main shaft 48 of the gear-wheel system 45 and the main shaft 48 is, in turn, coupled with a shaft 49, which is capable of driving the power takeoff shaft 7 via a pinion transmission. The shaft 46, 48 and 49 are coaxial. The housing of the gear wheel system 45 has a cover plate 50 to which the pump 30 and the motor 31 are secured so that the center line of the pump, the center line of the shaft 46 and the center line of the motor 31 are located in the same vertical plane. The input shaft 51 of the pump is provided with a pinion 52 which meshes with a pinion 53 which is co-axial with the shaft 48. A pinion 54 is disposed adjacent the pinion 53, and is also coaxial with the shaft 48. The pinions 53 and 54 are fastened to the shaft 48 by splines. The pinion 54 is the sun wheel of the planetary gear-wheel system. The pinion 54 meshes with a plurality of planet pinions 55, mounted on rotary shafts 56 which are supported by a planet carrier 57, which is coaxial with the shaft 48. On the side away from the carrier 57, the planet pinions 55 are supported by a ring 58. The planet carrier 57 is integral with a tubular drive shaft 59 which is coaxial with the shafts 46, 48 and 49 and is journalled in the housing of the gear-wheel system 45. The drive shaft 59 is drivingly connected to the input shaft of the gear box 6 and hence to the rear wheels 2. On the side farthest from the shaft 48 the planet wheels 55 mesh with internal teeth of the annulus 60 which is rotatably journalled on the outer side of the driving shaft 59 and on the inner side of part of the housing of the gear wheel system 45. An output shaft 61 of the motor 31 carries a pinion 62, which meshes with the internal teeth of the annulus 60. In the upper part of the housing of the gear wheel system 45 is journalled a pivotal shaft 63, which is rigidly secured to an arm 64 and to a driver-controlled lever 65 projecting outside the housing. To the end of the arm 64 away from the pivotal shaft 63 is fastened a brake shoe 66 which, when viewed in a direction parallel to the center line of the shaft 48, has an operative part-cylindrical braking surface. By turning the lever 65 the brake shoe can be brought into contact with the cylindrical outer surface of the annulus 60.

The embodiment of FIG. 3 operates as follows.

When during operation the plow is drawn to a greater depth into the soil so that the tractive force exerted on the tractor will increase, the lower lifting arms 13 shift to the rear so that the arm 41 will turn in the direction A. Since in the medium position shown in FIG. 3 the rod 47 is in line with the arm 41, the rod 47 will shift in the direction B, as a result of which the arm 42 turns in the direction C. Thus the control valve 43 causes the swashplate of the pump 30 to move to increase the angle between the plane of the swashplate disc and the center line of the pump. This causes the fluid displacement of the pump to decrease and the output speed of the output shaft 61 of the motor 31 to also decrease. Since the output shaft 61 of the motor 31 is coupled by means of the pinion 62 with the annulus 60, the planet wheels 55 also being in mesh with the annulus 60 will rotate more slowly so that the speed of the planet carrier 57 and hence that of the drive shaft 59 of the rear wheels 2 decreases, since the sun wheel 54, which is directly coupled with the engine 3, rotates at the constant speed of the engine 3. Thus when the plow moves to a greater depth, the travelling speed of the tractor will decrease so that the driving torque of the rear wheels 2 rises.

When the lifting device 12 is lifted, the arm 41 will turn in the direction D so that the rod 47 again shifts in the direction B out of the operative medium position shown in FIG. 3, the results in the planetary driving system 45 being the same as those described above. Therefore when the plow is lifted the tractor will reduce its speed without delay.

The springs 28 and 29 tend to urge the arms 23 and 41 back into the medium position.

When the lower lifting arm 13 is urged in the forward direction, for example, when a vehicle coupled with the tractor pushes on the tractor when coming down a slope, the arm 41 again turns in the direction D so that the rod 47 again shifts in the direction B and the travelling speed of the tractor also decreases The brake shoe 66 and the parts connected to it act as an overriding mechanism which allows the control arrangement described above to be rendered inoperative. When the lever 65 is moved by the driver into the position shown in FIG. 4, the brake shoe 66 is in contact with the outer surface of the annulus 60 and the speed of this annulus will become zero. In this case the drive shaft 59 will be directly driven by the output shaft 46 of the engine 3 via the pinions 54 and 55, the hydraulic drive 5 being inoperative. The driver is than in a position to determine the travelling speed by means of the manually controllable gear box 6. The lever 65 can be coupled with the control lever 44 of the change-speed gear crossing the lever 65 in a manner such that the lever 64 turns into the position in which the fluid displacement of the pump is zero. Under these conditions a working position is attained in which an advantageous working speed (about six kilometers per hour is obtained.

It should be noted that the hydraulic pump 30 is driven via the pinions 52 and 53 from the engine output shaft 46.

In the position described above, the torque convertor can be used without loss. The overriding mechanism may be used when the hydraulic drive 5 does not become operative.

If the overriding mechanism is not made operative the travelling speed of the tractor will automatically match the required tractive force, while the travelling speed decreases when the tractive force abruptly decreases or a negative tractive force would occur.

The setting of the springs 28 and 29 is such that when the tractor shown in FIG. 3 is in the no-load state the arm 41 is slightly deflected in the direction D to an extent such that at the occurrence of tractive force associated with normal plowing the arm 41 and the rod 47 are in line with one another.

The device described can be modified to be suitable for use when the tractor travels in the reverse direction rather than in the forward direction as shown in the Figures. In this case a lifting device arranged on the other side of the frame from the lifting devive 12 can be used with one of the control arrangements described above. The assembly of the driver seat, steering device and control-members is then turned through 180° so that the lifting device 12 is at the front of the tractor, with respect to its actual direction of travel. This does not affect the control arrangement, since the latter is operative in both directions.

An alternative solution of the problem of obtaining a reduction in speed of the tractor, when the force exerted by an implement on the tractor decreases, will be described with reference to FIGS. 5 and 6.

A high-powered tractor drawing a plow may have a control arrangement which causes the plow to be raised somewhat when increased resistance is encountered. In such a tractor, the tractive force of the tractor may increase to high values while the tractive force exerted on the tractor by the plow would decrease as the plow is lifted. This will cause the tractor to increase its speed. Not only does this result in an irregular working depth, but, when the tractor driver intentionally lifts the plow out of the soil (for example when turning round at the end of the field), the control arrangement would react in such a manner that the speed of the tractor would increase to the maximum speed of the tractor which is dangerous at an instant when the tractor driver's attention is focussed on lifting the plow and making the correct turn. In order to obviate this disadvantage when such a control arrangement is used, the tractor is provided with a control arrangement which will now be described and which may, in principle, be combined with the control arrangements operating during the plowing operation.

Figure 5:
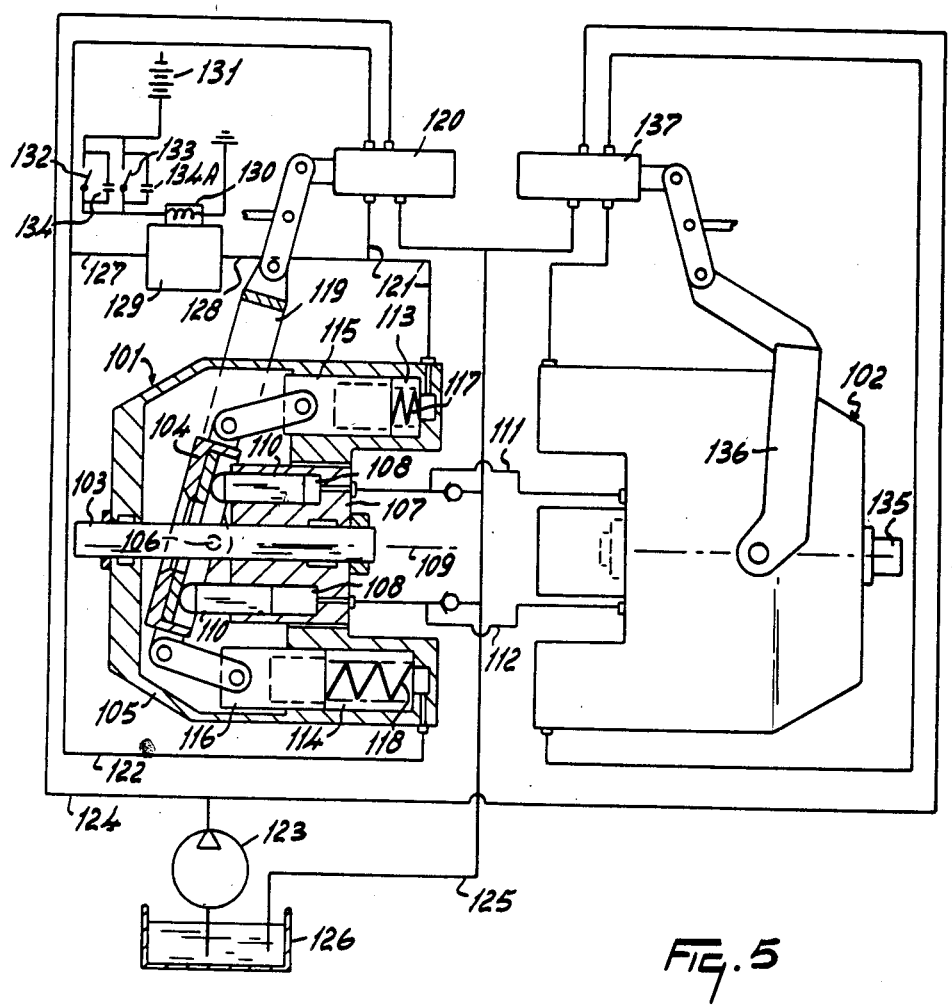
FIG. 5 is a schematic illustration of a hydrostatic torque converter which can be used with tractors similar to those of FIGS. 1 to 3.

FIG. 5 shows hydraulic pump 101 and a hydraulic motor 102 of the torque convertor of the tractor. The pump 101 comprises a drive shaft 103 which can be driven by the driving engine (not shown) of the tractor. The drive shaft 103 is provided with a swashplate 104 which is pivotable for stepless adjustment with respect to the housing 105 of the pump 101 about a pivotal shaft 106 which is journalled in the housing 105. To the drive shaft 103 is fastened a cylinder block 107 which turns with the shaft 103 and in which cylinders 108 are provided, the center lines of which are all the same distance from the center line 109 of the driving shaft 103. The cylinders 108 receive plungers 10, whose ends projecting out of the cylinder block 107 bear on the swashplate 104. The interior of each cylinder 108 communicates through bores in the cylinder block 107 with hydraulic ducts 111 and 112 connected to the hydraulic motor 103 to provide the transfer of energy between the pump 101 and the motor 102.

Adjusting cylinders 113 and 114 are provided in the housing 105, the center lines of which are farther from the center line 109 than those of the cylinders 108. The adjusting cylinders 113 and 114 receive plungers 115 and 116 respectively, the ends of which nearer the swashplate 104 are pivotally connected to the swashplate 104 at its circumference. The adjusting cylinders 113 and 114 contain springs 117 and 118, which bias the plungers 115 and 116 out of the cylinders 113 and 114 respectively.

The swashplate 104 is rigidly secured to the pivotal shaft 106 and can be adjusted from outside the pump 101 by means of an adjusting arm 119 which is mechanically coupled with a control valve 120, which is under the manual control of the driver. The adjusting cylinders 113 and 114 communicate through hydraulic ducts 121 and 122 respectively with the control valve 120.

A hydraulic fluid pump 123 driven by the engine of the tractor delivers fluid at high pressure to the control valve 120 through a hydraulic duct 124. Fluid is returned to a reservoir 126 through a hydraulic duct 125.

Communication between the ducts 121 and 122 connecting the control valve 120 with the adjusting cylinders 113 and 114 respectively is possible by means of short circuit ducts 127 and 128. A hydraulic valve 129 of the control arrangement can place the ducts 127 and 128 into or out of communication with one another. The valve member of the valve 129 is controlled by an electro-magnetic solenoid 130 arranged on the housing of the valve 129. The solenoid 130 can be supplied with current from the battery 131 of the tractor which can be connected to the solenoid 130 by either of two switches 132 and 133 connected in parallel. The switches 132 and 133 are each bridged by a capacitor 134 and 134A respectively.

Structurally, the hydraulic motor 102 may be identical with the pump 101. It has an output shaft 135, which is coupled with driven ground wheels of the tractor. The motor 102 may, if desired, have a swashplate like that of the pump 101 to serve as an additional part of the control arrangement of the torque converter, which is coupled, by an adjusting arm 136 (similar to the adjusting arm 119), with a control valve 137 actuated by the driver, but this additional part of the control arrangement is not essential.

FIG. 6 shows schematically an arrangement for controlling fuel injectors of a fuel injection system of the driving engine of the tractor. One injector is provided for each cylinder of the engine. FIG. 6 shows three fuel injectors, but his number depends upon the number of cylinders of the driving engine which may be, for example, a Diesel engine. FIG. 6 shows schematically a cam shaft 138 provided with a plurality of cams 139, one for each injector. Each of the cam 139 is disposed eccentrically with respect to the center line of the shaft 138 and is positioned to operate a plunger 140. The plunger 140 is guided axially by a plunger housing 141, which is stationary with respect to the engine block. The cylindrical plunger housing 141, in which the plunger 140 is a close fit has at the top two transverse bores 142 through which fuel can be supplied. The lower part of the plunger housing 141 is surrounded by a substantially cylindrical control sleeve 143. The top end of the control sleeve 143 is constructed as a pinion 144 and near its lower end the wall of the control sleeve 143 has an axially extending slot 145, which extends downwardly to the end face of the control sleeve 143. The control sleeve 143 is always beneath the lower end surface of the plunger housing 141. The plunger 140 is provided with a lug 146, which is displaceable axially in the slot 145 of the control sleeve 143. The pinion 144 at the top of the control sleeve 143 meshes with a toothed rack provided on a control member in the form of a control rod 147. The length of the control rod 147 lies in a plane perpendicular to the center lines of the plungers 140. The toothed rack of the control rod 147 is in engagement with the pinions 144 of all of the injectors arranged side by side in a row. The top face of the plunger 145 has an axial bore 148 which communicates with slot 150 through a radial bore 149 at the level of the lower end of the bore 148. The slot 150 comprises a helical recess in the cylindrical outer surface of the plunger 140. Viewed in an axial direction, the ends of the slot 150 subtend a circumferential angle of, for example, 30° to 45°. The two ends of the slot 150 are located at different axial positions along the plunger 140.

During operation of the engine, each plunger 140 is moved up and down by the respective cam 139 of the cam shaft 138, the plungers 140 of the different fuel pumps being moved out of phase with one another. During this up and down movement of the plungers 140, the lug 146 moves in the slot 145 of the control sleeve 143. In the lowermost position of the plunger 140, its top surface is below the bores 142 so that the space above the plunger can receive fuel supplied from one of the bores 142. The other bore 142 is connected to the fuel tank. When the plunger 140 moves upwards, the fuel will be fed under pressure in the direction A to an injection nozzle connected to the top of the plunger housing 141 after the top surface of the plunger 140 closes the bores 142. The fuel pressure built up in the space above the plunger 140 depends upon the characteristics of the injection nozzle. This pressure is built up until any part of the slot 150 communicates with the bore 142 communicating with the fuel tank. As soon as this happens, the fuel under pressure above the plunger 140 can flow back to the fuel tank through the bore 148, the radial bore 149, the slot 150 and the bore 142 in the plunger housing 141 so that the pressure above the plunger is relieved. Since the slot 150 extends helically over part of the surface of the plunger 140, it will be obvious that the axial position of each plunger 140 at which the communication is established between the pressurized fuel and the bore 142 depends upon the rotary position of the plunger 140 with respect to the bore 142 and the plunger housing 141. When the plunger 140 is turned in the direction of the arrow B, the slot 150 will communicate, during the up and down movement of the plunger 140, earlier with the bore 142, so that the pressure of the fuel is relieved at an earlier instant than in the position shown in FIG. 6. Thus, by rotating the plunger 140 in the direction of the arrow B or in the opposite direction, the quantity of fuel injected at each stroke can be controlled. Rotation of the plungers 140 is achieved by displacing the control rod 147 in its lengthwise direction. Since the rack of the control rod 147 meshes with the pinions 144 of all of the fuel injectors, the fuel injectors of all of the cylinders will be adjusted to the same extent. By displacing the control rod 147 in its lengthwise direction, the pinion 144 and hence the control sleeve 143 is turned about the stationary plunger housing 141. The engagement between the slots 145 and the lug 146 causes the plunger 140 to be turned through the same angle as the control sleeve 143 so that in the new position a different part of the slot 150 comes first into communication with the bore 142, so that a different amount of fuel is injected per cycle of the engine.

An engine provided with fuel injection, such as a Diesel engine, is usually controlled by means of a centrifugal governor so that during operation the rotational speed of the engine remains substantially constant. If there is an increase in the load on the driving engine, applied, for example, by a plough, the rotational speed of the engine will initially drop slightly. The control rod 147 will then be displaced by the centrifugal governor to cause more fuel to be injected per cycle so that the engine torque increases until the set speed is regained. Since this control always acts to achieve a substantially constant speed, in increase in engine torque means a proportional increase in engine power. Furthermore the driver can also manually control the position of the control rod 147 and hence the amount of fuel injected per cycle, the engine torque and the engine power.

The control arrangement comprises two control members in the form of extensions or stops 151 and 152 arranged, for example, near one end of the control rod 147. Two trip members 153 and 154 are arranged in a housing 155 and are disposed one on each side of the stops 151 and 152. The housing 155 contains the two switches 132 and 133 and the associated capacitors 134 and 134A shown in FIG. 5. If the trip members 153 and 154 are not in contact with the stops 151 and 152 respectively, the switches 132 and 133 in the housing 155 remain open so that the solenoid 130 is not energized and the valve member of the valve 129 (FIG. 5) is held by spring force in a position which blocks the flow of hydraulic fluid from the duct 127 towards the duct 128. In this case the control valve 120 actuates the plungers 115 and 116 for adjusting the swashplate 104 in the normal manner.

When the drive shaft 103 is driven by the engine, the cylinder block 107 is also rotated so that, at least in the embodiment shown in FIG. 5 the plungers 110 are cyclically pressed by the swashplate 104 into their cylinders 108 and high-pressure hydraulic fluid is fed towards the motor 102. The hydraulic pressure so generated is converted into rotation of the output shaft 135. Comparatively low-pressure fluid is fed back through the duct 112 towards the pump 101 to cause the lower plunger 110 as shown in FIG. 5 to contact the swashplate 104. Further rotation causes the swashplate 104 to move this plunger inwardly. The angle between the swashplate 104 and the center line 109 determines the pressure produced in the pump and therefore the torque transferred via the output shaft 135 to the driven wheels. This angle is adjustable by means of the adjusting arm 119, which can be manually adjusted by the driver and/or automatically adjusted by the control valve 120.

If the tractor is drawing a plow through the soil, and the resistance to movement increases, the tractive force applied by the tractor will increase to a very high value. If a control arrangement, which is not essential in this case, is used for increasing the output torque, this control arrangement can operate by displacing the control rod 147 in the direction D so that more fuel per cycle is injected into the combustion space of the engine. With such an arrangement, overload may occur because the travel speed of the tractor decreases and very high torques may be developed. If such a situation becomes imminent, the trip member 152 depresses the contact pin 154 so that the switch 132 (FIG. 5) is closed. The solenoid 130 is thus energized and moves the valve member of the valve 129 to place the duct 127 into communication with the duct 128. In the position shown in FIG. 5 the cylinder 114 is supplied with fluid at a higher pressure than the cylinder 113, as controlled by the control valve 120. When the ducts 127 and 128 communicate with one another, the hydraulic fluid in the cylinders 113 and 114 is at the same pressure in both cylinders so that the plungers 115 and 116 each move into the same position as the other with respect to the housing, biased not only by the hydraulic fluid but also the springs 117 and 118. The swashplate 104 then moves into a position in which it is perpendicular to the center line 109. The transmission ratio of the torque converter comprising the pump 101 and the motor 102 is, therefore, adjusted independently of the action of the centrifugal governor on the engine to achieve a rapid slow-down of the tractor to limit the torque applied by the engine.

If the control system is such that, when the plow gets into heavier soil, the three-point lifting device to which the plow is hitched is automatically lifted, in order to prevent the speed of the tractor from dropping too far, there is the risk that at the end of the furrow when the driver lifts the plow, for example, to turn round, the speed of the tractor may increase excessively at a place where this speed should be limited in order to enable the desired maneuvering to take place safely. The driver is fully occupied in lifting the plow and making the correct turn, and a sudden increase in the speed of the tractor at this moment can cause accidents. This is avoided by the control arrangement described. When the plow is deliberately raised, the control rod 147 will move in the direction C under the action of the governor because, since the torque required decreases, less fuel needs to be injected into the engine per cycle. Even so, the speed of the tractor nevertheless tends to increase rapidly. The trip member 151 will then come into contact with the contact pin 153 which is depressed so that the switch 133 is closed (FIG. 5) and again the solenoid 130 is energized, to close the valve 129 so that the ducts 127 and 128 are placed in communication with one another. As before, the adjusting cylinders 113 and 114, which have significantly different pressures in normal operation, will have their pressures equalized so that the plungers 115 and 116 will occupy the same positions as each other and the swashplate 104 again moves into a position perpendicular to the center line 109. It is thus possible, by controlling the torque convertor, to obtain a rapid decrease of the tractor speed so that the above-mentioned disadvantages is avoided.

Recapitulating, the control arrangement described is included in the tractor system so that the torque convertor is adjusted to give a lower travelling speed when certain conditions occur, for example, when the engine is rotating very slowly at high loads, or when the engine is rotating rapidly at low loads. The relative positions of the trip members 151 and 152 and of the pins 153 and 154 depends, of course upon the properties of the engine and of the torque convertor and are determined for each type of tractor. It is possible for the trip members 151 and 152 to be adjustable along the control rod 147 and fixable in any one of a plurality of positions in order to adjust the operational characteristics to suit different implements and kinds of soil. It will be obvious that the control system, which is electrically actuated in the embodiment described, may be hydraulically or mechanically operated. For example, the trip members 151 and 152 may directly control hydraulic valves controlling the valve 129 or thrust rods may be provided which are actuated by the trip members to control the valve 129 mechanically.

It will be obvious that the control arrangement described, or a similar one, may be operable on the swashplate of the motor 102, for example to reduce the reaction time of the arrangement.

The valve 129 may as an alternative be disposed between the hydraulic ducts 111 and 112 interconnecting the pump 101 and the motor 102. A short-circuit between these ducts rapidly decreases the engine torque.

The control arrangement may furthermore be used in a similar manner with different types of torque convertors, for exaample, a continuously variable belt transmission, in which the belt is passed around adjustable pulleys, the flanges of which are relatively displaceable, for example, by hydraulic means. The flanges may be loaded by a spring so that if the hydraulic pressure is relieved, the pulleys move towards one another or away from one another respectively. The control arrangement 129 to 134, 151 to 154 may be used in this case while the ducts 127 and 128 can short-circuit the hydraulic pressure which resists the spring pressure.

While various features of the tractors described and illustrated in the drawing, are specifically claimed in the following claims as inventive features, the invention is not necessarily so limited and may encompass other inventive features that have been disclosed both individually and in various combinations:

1. A motor vehicle comprising an engine and a wheeled frame having coupling means for an attachment, a variable drive interconnecting the vehicle engine to the wheels of the vehicle, said drive comprising control means operatively associated with said coupling means wherein the control means operates said drive to reduce the rotational driving speed of said wheels responsive to changes in continual forces exerted by the load of an attachment on said coupling means wherein one of the changes to which said control means is responsive is an increase in the retarding force of an attachment exerted on said coupling means and another is an increase in the portion of the weight of of said changes attachment borne by said coupling means, said control means operating said drive to reduce the driving speed of said wheels, such that the operation of said drive by said control means is the same both for when said control means responds to said one change and for when said control means responds to said another change.

2. A vehicle as claimed in claim 1, in which said coupling means comprises a multi-point lifting device with arms pivoted to said vehicle.

3. A vehicle as claimed in claim 2, in which at least part of said coupling means is displaceable by said force exerted by said attachment with respect to the rest of the vehicle in the intended direction of operative travel of said vehicle.

4. A vehicle as claimed in claim 3, in which a lower lifting arm of the lifting device is displacable relative to the rest of the vehicle in the forward direction of operative vehicle travel.

5. A vehicle as claimed in claim 4, in which the displaceable arm is connected to a control part that is spring-biased to a neutral position.

6. A vehicle as claimed in claim 4 comprising a lifting rod means connected to said lower lifting arm for raising and lowering same together with an attachment when connected thereto so that when an implement is connected to said lower lifting arm, said lower lifting arm is moved forwardly with respect to the tractor frame when it is raised by said lifting rod means, said forward movement causing a change in said continual forces causing said control means to reduce the rotational driving speed of said wheels.

7. A vehicle as claimed in claim 3, in which said coupling means comprises a towing hitch an arm of which is displaceable relative to the vehicle in the forward direction with respect to the direction of vehicle travel.

8. A vehicle as claimed in claim 7, in which the displaceable arm of said coupling means is connected with a displacement pick-up.

9. A vehicle as claimed in claim 8, in which the variable drive includes a torque converter in a hydraulic drive system and the displacement pick-up is coupled with adjustment means that adjusts the output of said torque convertor.

10. A vehicle as claimed in claim 9, in which said adjustment means comprises a swashplate of said drive.

11. A vehicle as claimed in claim 10, in which the connection between said displaceable arm of the coupling means and the adjustment means operates to pivot said swashplate and change the output speed of the torque convertor.

12. A vehicle as claimed in claim 1, in which said coupling means comprises a towing hitch having a displaceable part connected to said control means, whereby an increase in the attachment load displaces said part forwardly with respect to the direction of vehicle travel and the rotational drive speed to the vehicle's wheels decreases.

13. A vehicle as claimed in claim 12, in which said control means comprises an electrical circuit that is connected to a torque convertor of said drive.

14. A vehicle as claimed in claim 13, in which a switch in said circuit is actuated by said displaceable part and adjustment of said torque convertor is effected electrically.

15. A vehicle as claimed in claim 14, in which the torque convertor has a hydraulic drive and comprises a hydraulic pump coupled with a hydraulic motor.

16. A vehicle as claimed in claim 15, in which said drive includes a gear box arranged to transmit power from the hydraulic drive to the wheels of the vehicle.

17. A vehicle as claimed in claim 16, in which the control means for the hydraulic drive is selectively operable by automatic and manual control by the coupling means and by the driver respectively.

18. A vehicle as claimed in claim 13, in which the output of said torque convertor is adjustable by the control means whereby a higher than normal attachment load decreases the output to the vehicle wheels.

19. A vehicle as claimed in claim 13, in which said control means includes a hydraulically adjustable control valve that regulates the output of said torque converter.

20. A vehicle as claimed in claim 1, wherein said drive includes a hydraulic torque converter that has a swashplate and said swashplate is pivotable by the control means.

21. A vehicle as claimed in claim 20, in which the control means has a displaceable rod that adjusts the amount of fuel to the engine and said torque convertor adjusts to provide a lower output independent upon the amount of fuel injected per cycle into said engine.

22. A vehicle as claimed in claim 21, in which said convertor has a hydraulic pump and a hydraulic motor hydraulically coupled therewith, said pump and motor each having a respective swashplate.

23. A motor vehicle comprising an engine and wheeled frame having coupling means for an attachment, a variable drive interconnecting said vehicle engine to the vehicle's wheels, said drive comprising control means operably associated with said coupling means that reduces the rotational driving speed of said wheels responsive to a change in the load of an attachment on said coupling means, said coupling means comprising a multiple-point lifting device with arms pivoted to the vehicle, at least part of said coupling means being displaceable by said attachment with respect to the rest of the vehicle in the intended direction of the vehicle's operative travel, said coupling means also comprising a towing hitch, an arm of which is displaceable relative to the vehicle in the forward direction with respect to the direction of the vehicle's travel, said displaceable arm being connected with a displacement pick-up, said variable drive including a torque converter in a hydraulic drive system and said displacement pick-up being coupled with adjustment means that adjust the output of said torque converter, said adjustment means comprising a swash plate of said drive, the connection between said displaceable arm of said coupling means and said adjustment means operating to pivot said swash plate and change the output speed of said torque converter, said displaceable arm being connected to said adjustment means by two relatively pivotable elongate coupling members, said members being in a line with one another in a medium position.

24. A vehicle as claimed in claim 23, in which the medium position corresponds to an output tractive force exerted of the wheels during normal operation.

25. A vehicle as claimed in claim 23, in which one of said coupling members is pivotable out of said medium position about a stationary pivotal axis in two directions and the other coupling member is displaceable in the same direction in both directions of pivotal movement.

26. A vehicle as claimed in claim 25, in which said other coupling member is connected to the adjustment means of said torque convertor.

27. A motor vehicle comprising an engine and a wheeled frame having coupling means for an attachment, a variable drive interconnecting said engine to the vehicle's wheels, said drive comprising control means operatively associated with said coupling means that reduces the rotational driving speed of said wheels responsive to changes in the load of an attachment on said coupling means, said coupling means also comprising a towing hitch having a displaceable part connected to said control means so that an increase in the attachment load displaces said part forwardly with respect to the direction of the vehicle's travel and the rotational drive speed to the vehicle's wheels decreases, said control means comprising an electrical circuit that is connected to a torque converter of said drive, the output of said torque converter being adjustable by said control means and a zero or lower than normal attachment load decreasing the output to the vehicle's wheels.

28. A motor vehicle comprising an engine and a wheeled frame having coupling means for an attachment, a variable drive interconnecting said engine to the vehicle's wheels, said drive comprising control means operatively associated with said coupling means that reduces the rotational driving speed of said wheels responsive to a change in the load of an attachment on said coupling means, said drive including a hydraulic torque converter that has a swash plate which is pivotable by said control means, said control means having a displaceable rod that adjusts the amount of fuel to said engine and said torque converter adjusts to provide the lower output independent upon the amount of fuel injected per cycle into said engine, said converter having a hydraulic pump and a hydraulic motor hydraulically coupled therewith, said pump and said motor each having a respective swash plate, each said swash plate being pivotably adjustable by respective hydraulic pistons, the pressure applied to said pistons being equalized by said control means.

29. A vehicle as claimed in claim 28, in which the control means comprises a valve which can be adjusted to short-circuit the hydraulic pressure to said pistons.

* * * * *